United States Patent
Argue et al.

(10) Patent No.: US 8,682,731 B1
(45) Date of Patent: Mar. 25, 2014

(54) REAL-TIME, PAPER-SAVINGS-REPORTING APPARATUS AND METHOD

(71) Applicant: Wal-Mart Stores, Inc., Bentonville, AR (US)

(72) Inventors: Stuart Argue, Palo Alto, CA (US); Anthony Emile Marcar, San Francisco, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 13/665,897

(22) Filed: Oct. 31, 2012

(51) Int. Cl.
*G06G 1/12* (2006.01)
*G06K 5/00* (2006.01)

(52) U.S. Cl.
USPC ............................................. 705/21; 235/377

(58) Field of Classification Search
USPC .......................................................... 705/21
See application file for complete search history.

(56) References Cited

U.S. PATENT DOCUMENTS 8,336,762 B1 * 12/2012 DiMattina et al. ............. 235/377
8,434,682 B1 * 5/2013 Argue et al. .................. 235/383

* cited by examiner

*Primary Examiner* — Garcia Ade
(74) *Attorney, Agent, or Firm* — David R. Stevens; Stevens Law Group

(57) ABSTRACT

A computer-implemented method is disclosed for motivating customer participation in an electronic receipt program. Within the method, a point-of-sale transaction may be initiated. The transaction may involve a computer system comprising a point-of-sale system and a customer possessing a mobile computing device. The computer system may generate receipt data documenting the transaction and deliver the receipt data to the mobile computing device in electronic format. The computer system may further determine an amount of paper saved by delivering the receipt data in electronic format rather than as a paper receipt and pass the amount to the mobile computing device.

20 Claims, 6 Drawing Sheets

REAL-TIME, PAPER-SAVINGS-REPORTING APPARATUS AND METHOD

BACKGROUND

1. Field of the Invention

This invention relates to point-of-sale systems and more particularly to systems and methods for motivating customers to participate in an electronic receipts program.

2. Background of the Invention

Many point-of-sale (POS) systems currently in use today do not support important emerging technologies, services, and marketing opportunities. For example, many POS systems are limited in their ability to collect and analyze electronic receipt data. As a result, those POS systems cannot effectively implement many novel methods and services surrounding such data. Accordingly, what is needed is an apparatus and method expanding the ability of a wide variety of POS systems and supporting computer systems, include legacy POS systems, to use electronic receipt data to benefit customers.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
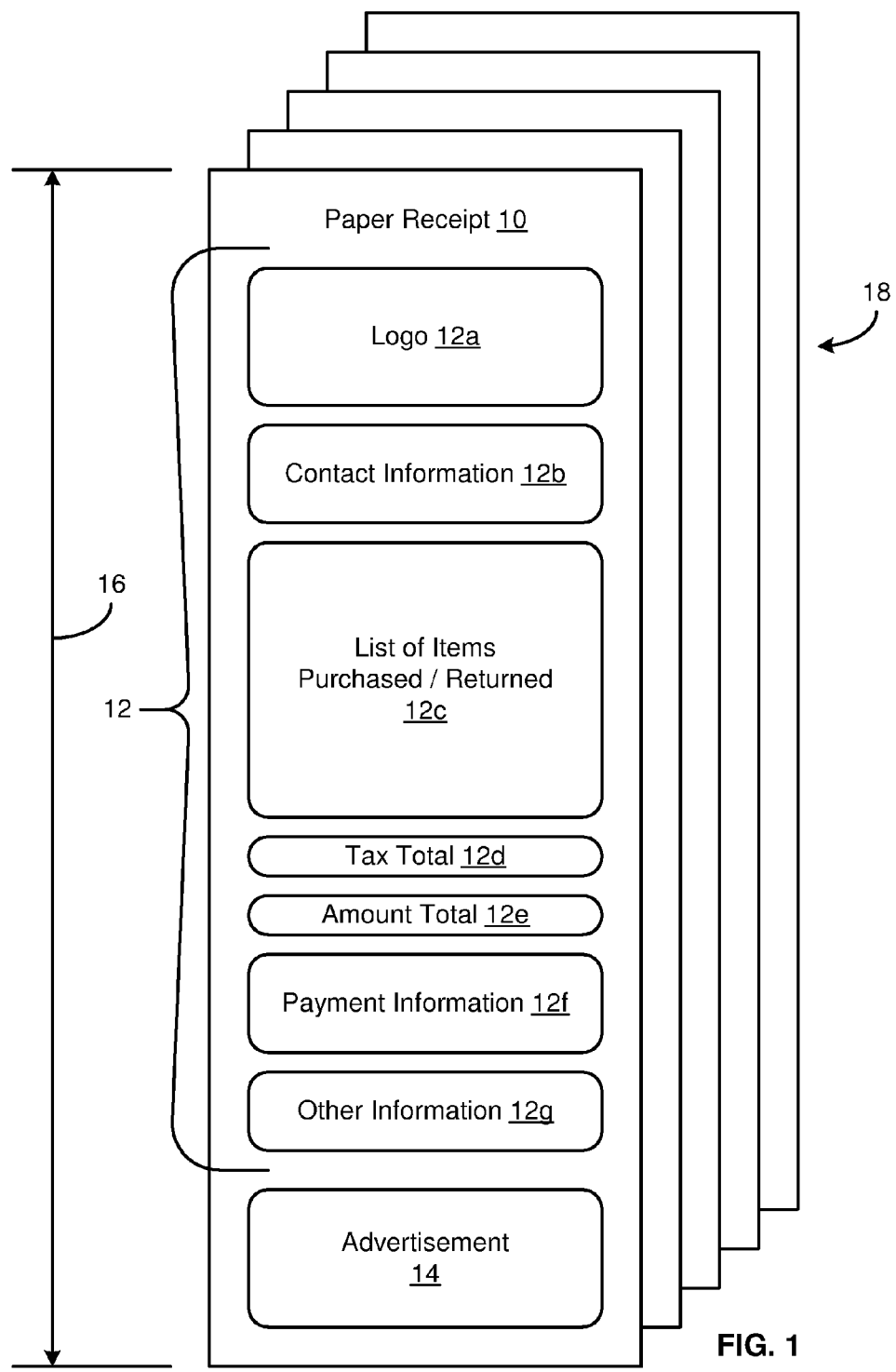
FIG. 1 is a schematic block diagram of one embodiment of a paper receipt in accordance with the present invention.

Referring to FIG. 1, in selected embodiments, one or more computers, computers systems, mobile computing devices, or the like or a combination or sub-combination thereof may support, encourage, enable, or administer an electronic receipts program. Electronic or "paperless" receipts provide numerous benefits both to the customers who receive the electronic receipts and the businesses who issue them. In an electronic receipts program, a concerted effort may be made to transition and maintain one or more customers off of paper receipts and on to electronic receipts. In selected embodiments, certain apparatus and methods in accordance with the present invention may support the success of an electronic receipts program by highlighting one or more of the benefits associated with electronic receipts.

For example, one benefit associated with electronic receipts is an ecological benefit arising from a reduced consumption of the paper and inks associated with paper receipts. To highlight this benefit, certain apparatus and methods in accordance with present invention may quantify this reduction so that it can be presented to a corresponding customer or used in generating feedback (e.g., positive feedback to encourage paper saving through the continued use of electronic receipts) sent to a corresponding customer. Given the long paper receipts many retailers currently issue, this reduction may be significant.

That is, paper receipts include a significant amount of information. As the information communicated by paper receipts has increased, so has the amount of paper used to print them. For example, in selected embodiments in accordance with the present invention, a paper receipt 10 may present an array of receipt data 12 including a logo 12*a*, contact information 12*b*, a list 12*c* of items purchased or returned, a total 12*d* indicating the sales tax assessed or returned, a total 12*e* indicating the amount paid or returned, payment information 12*f*, other information 12*g*, or the like or combinations or sub-combinations thereof.

A logo 12*a* may reinforce the brand and image of the associated entity within the mind of a consumer. By including contact information 12*b* on a receipt 10, an entity may ensure that a customer has ready access to one or more physical addresses, Internet address, telephone numbers, facsimile numbers, hours of operation, or the like or combinations or sub-combinations thereof. One or more of a list 12*c* of items purchased or returned, a total 12*d* indicating the sales tax assessed or returned, a total 12*e* indicating the amount paid or returned, and payment information 12*f* (e.g., date of transaction, an indication of method of payment, an indication of which credit or debit card was used, etc.) may be included to document important details of a transaction.

Other information 12*g* may be included within a receipt 10 as desired or necessary. For example, to promote brand loyalty, an entity may include an indication of an amount saved in the transaction, a yearly total of the amount saved, reward points earned, or the like. Alternatively, or in addition thereto, other information 12*g* may include promotional information, a solicitation to participate in a survey, an employment opportunity, contest information, or the like.

In certain embodiments, a paper receipt 10 may also include an advertisement 14. For example, a paper receipt 10 may include an advertisement 14 inviting a customer to download receipt data electronically, experience the benefits of using electronic receipts, download an application suitable for receiving and presenting electronic receipts, or the like or a combination or sub-combination thereof.

To accommodate all of the information, data 12, advertisements 14, or the like that are desired or necessary, a paper receipt 10 may require or consumer a certain length 16 of paper. Even for one receipt 10, this length 16 may be significant. However, over multiple shopping events, multiple customers, multiple POS systems, multiple stores, or the like, the total length of paper corresponding to the accumulation 18 of receipts 10 may be highly consequential. Accordingly, by highlighting the paper-saving benefits of electronic receipts, certain apparatus and methods in accordance with the present invention may support the success of an electronic receipts program.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer of a point-of-sale (POS) system, partly on a POS computer, as a stand-alone software package, on a stand-alone hardware unit, partly on a remote computer spaced some distance from the POS computer, or entirely on a remote computer or server. In the latter scenario, the remote computer may be connected to the POS computer through any type of network, including a local area network (LAN) or a wide area network (WAN), or the connection may be made to an external computer (e.g., through the Internet using an Internet Service Provider).

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
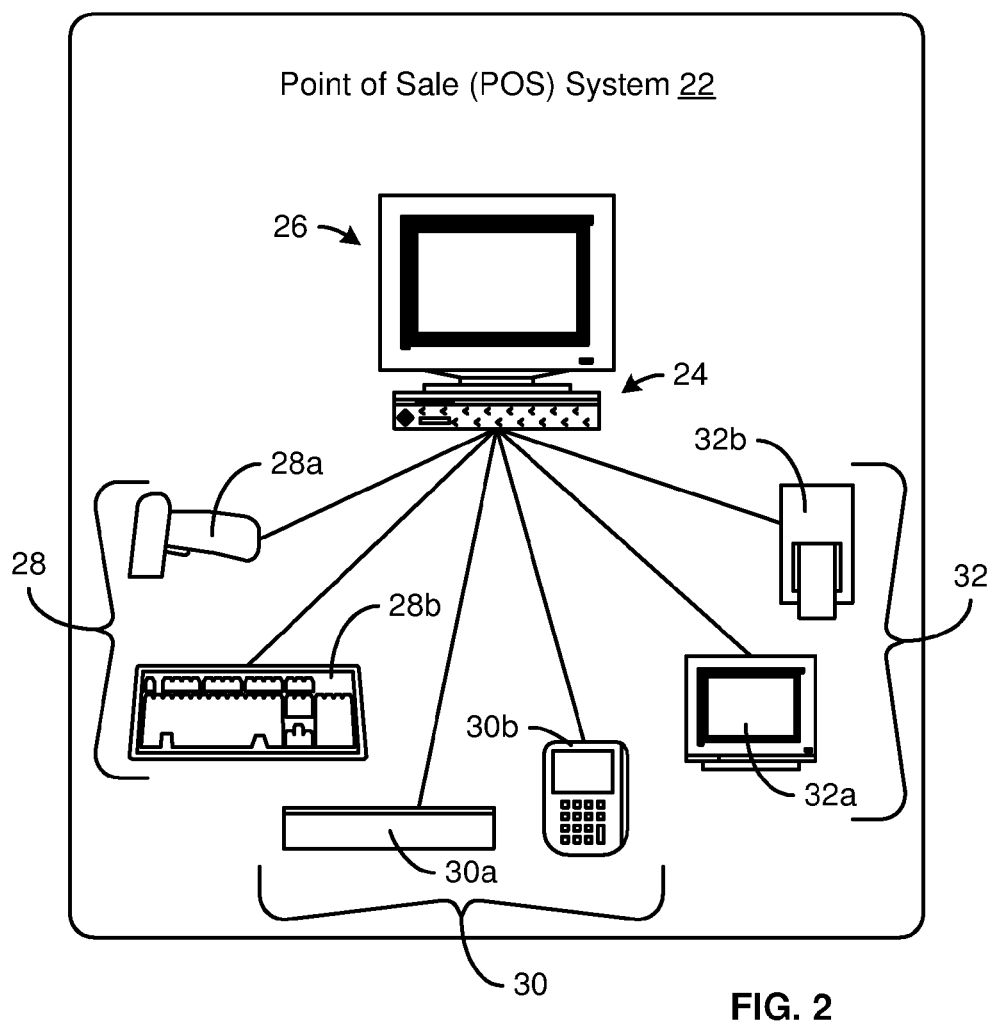
FIG. 2 is a schematic block diagram of one embodiment of a point-of-sale (POS) system for implement methods in accordance with the present invention.

Referring to FIG. 2, in selected embodiments, the hardware, software, or hardware and software of a POS system 22 may be configured to implement one or more methods in accordance with the present invention. A POS system 22 in accordance with the present invention may include various components. In certain embodiments, a POS system 22 may include a central or primary computer 24, a monitor 26 (e.g., a cashier-facing monitor 26), one or more input devices 28 (e.g., scanners 28a, keyboards 28b, scales, or the like), one or more payment devices 30 (e.g., cash drawers 30a, card readers 30b) for receiving or returning payments, one or more output devices 32 (e.g., customer-facing display 32a or monitor 32a, receipt printer 32b), or the like or combinations or sub-combinations thereof.

A computer 24 may form the primary processing unit of a POS system 22. Other components 28, 30, 32 forming part of a POS system 22 may communicate with the computer 24. Input devices 28 and certain payment devices 30 may feed data and commands to a computer 24 for processing or implementation. For example, a scanner 28a may pass data communicating the identity of one or more items to be purchased, returned, or the like to a computer 24. Similarly, a card reader 30b may pass payment information to a computer 24.

Conversely, output devices 32 and certain payment devices 30 may follow or implement commands issued by a computer 24. For example, a cash drawer 30a may open in accordance with the commands of a computer 24. Similarly, a customer-facing display 32a and receipt printer 32b may display or output data or information as instructed by a computer 24.

In selected embodiments, in addition to handling consumer transactions (e.g., purchases, returns), a POS system 22 may also provide or support certain "back office" functionality. For example, a POS system 22 may provide or support inventory control, purchasing, receiving and transferring products, or the like. A POS system 22 may also store sales and customer information for reporting purposes, marketing purposes, receivables management, trend analysis, cost analysis, price analysis, profit analysis, or the like. If desired or necessary, a POS system 22 in accordance with the present invention may include an accounting interface to pass certain information to one or more in-house or independent accounting applications.

Figure 3:
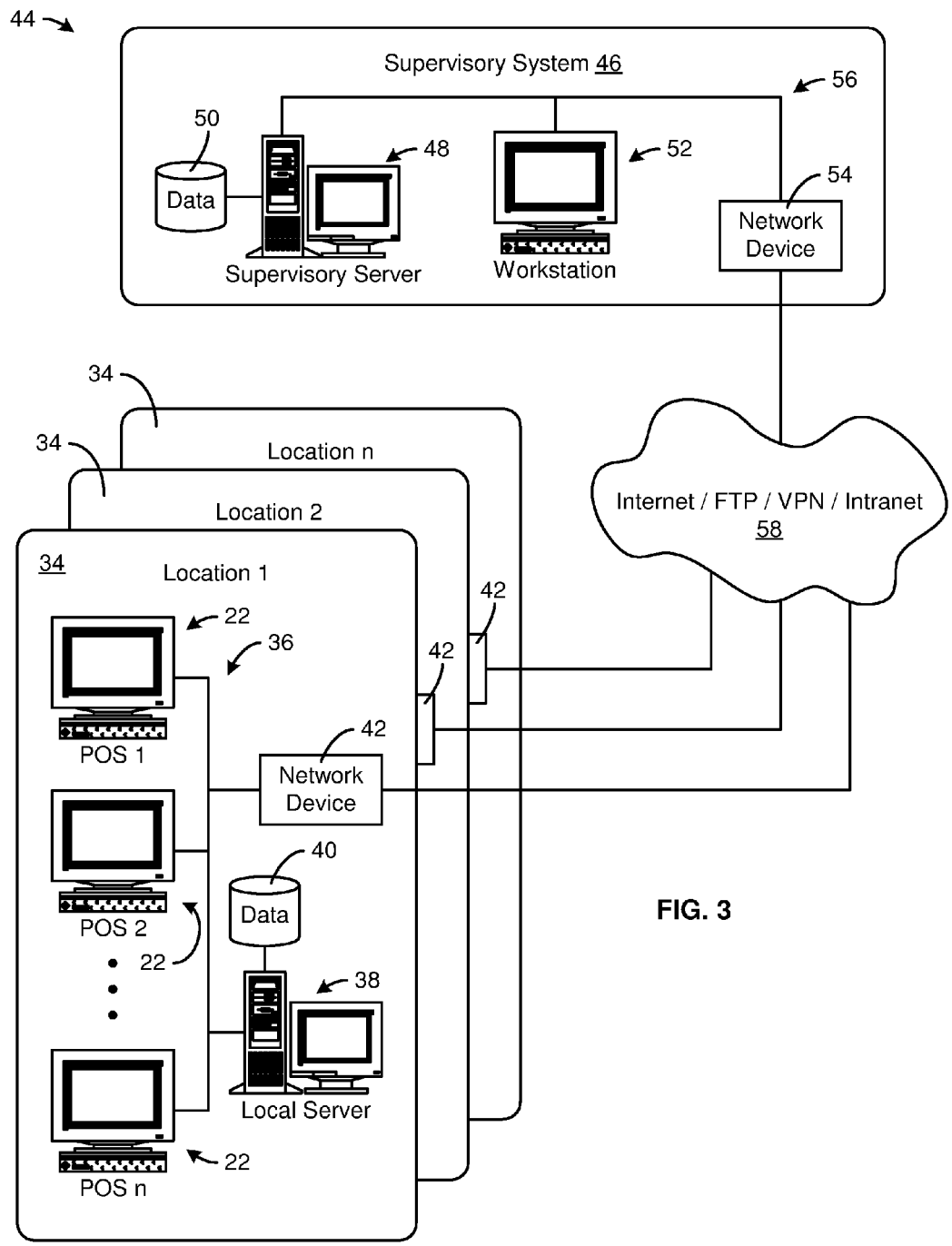
FIG. 3 is a schematic block diagram of one embodiment of multiple POS systems in accordance with the present invention operating in the context of an enterprise-wide system.

Referring to FIG. 3, in selected embodiments, a POS system 22 may operate substantially independently, as a stand-alone unit. Alternately, a POS system 22 in accordance with the present invention may be one of several POS systems 22 forming the front line of a larger system. For example, multiple POS systems 22 may operate at a particular location 34 (e.g., within a retail, brick-and-mortar store). In such embodiments, the various POS systems 22 may be interconnected via a LAN 36. A LAN 36 may also connect the POS systems 22 to a local server 38.

A local server 38 may support the operation of the associated POS systems 22. For example, a server 38 may provide a central repository from which certain data needed by the associated POS systems 22 may be stored, indexed, accessed, or the like. A server 38 may serve certain software to one or more POS systems 22. In certain embodiments, a POS system 22 may offload certain tasks, computations, verifications, or the like to a server 38.

Alternatively, or in addition thereto, a server 38 may support certain back office functionality. For example, a server 38 may receive and compile (e.g., within one or more associated databases 40) data from the various associated POS systems 22 to provide or support inventory control, purchasing, receiving and transferring products, or the like. A server 38 may also receive and compile sales and customer information for reporting purposes, marketing purposes, receivables management, trend analysis, cost analysis, price analysis, profit analysis, or the like.

In certain embodiments, one or more POS systems 22 or servers 38 corresponding to a particular location 34 may communicate with or access one or more remote computers or resources via one or more network devices 42. For example, a network device 42 may enable a POS system 22 to contact outside resources and verify the payment credentials (e.g., credit card information) provided by a customer. A network device 42 may comprise a modem, router, or the like.

In selected embodiments, a POS system 22 in accordance with the present invention may operate within an enterprise-wide system 44 comprising multiple locations 34 (e.g., branches 34 or stores 34). In such embodiments, each location 34 may have one or more POS systems 22, local servers 38, local databases 40, network devices 42, or the like or combinations or sub-combinations thereof connected by a computer network (e.g., a LAN 36). Additionally, each such location 34 may be configured to interact with one or more supervisory systems 46. For example, multiple branch locations 34 may report to an associated "headquarters" location or system.

A supervisory system 46 may comprise one or more supervisory servers 48, databases 50, workstations 52, network devices 54, or the like or combinations or sub-combinations thereof. The various components of a supervisory system 46 may be interconnected via a computer network (e.g., a LAN 56). In selected embodiments, a supervisory system 46 may comprise one or more supervisory servers 48 providing a central repository from which certain data needed by the one or more POS systems 22 or local servers 38 may be stored, indexed, accessed, or the like.

Alternatively, or in addition thereto, a supervisory server 48 may receive and compile (e.g., within one or more associated databases 50) data from the various associated POS systems 22 or local servers 38 to provide or support inventory control, purchasing, receiving and transferring products, or the like. A supervisory server 48 may also receive and compile sales and customer information for reporting purposes, marketing purposes, receivables management, trend analysis, cost analysis, price analysis, profit analysis, or the like.

A supervisory system 46 may be connected to one or more associated locations 34 or branches 34 in via any suitable computer network 58 (e.g., WAN 58). For example, in selected embodiments, one or more locations 34 may connect to a supervisor system 46 via the Internet. Communication over such a network 58 may follow any suitable protocol or security scheme. For example, communication may utilize the File Transfer Protocol (FTP), a virtual private network (VPN), intranet, or the like.

Figure 4:
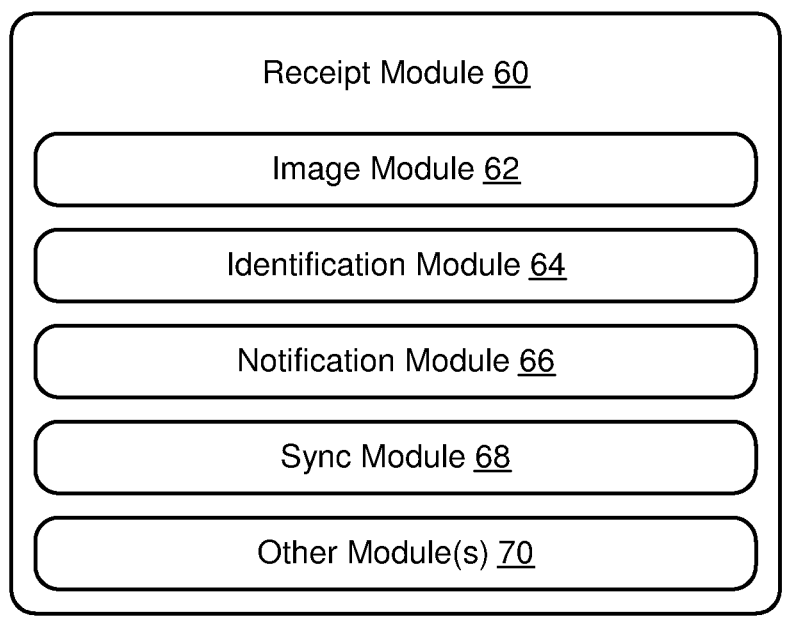
FIG. 4 is a schematic block diagram of one embodiment of a receipt module in accordance with the present invention.

Referring to FIG. 4, a POS system 22 may collect and/or generate receipt data 12. Receipt data 12 may document a transaction (e.g., sale or return) carried out by a POS system 22. For certain customers, receipt data 12 may be presented or displayed in the form of an electronic receipt. For example, in selected embodiments, receipt data 12 may be delivered to a customer's computing device (e.g., a mobile telephone, personal digital assistant (PDA), media player, tablet computer or reader, laptop computer, desktop computer, or the like, hereinafter a "computing device") by an entity's computer system (e.g., a system comprising one or more POS systems 22, local servers 38, supervisory servers 48, some other onsite resources, one or more applications running on a customer's computing device, some other offsite resources, or the like or combinations or sub-combinations thereof, hereinafter a "computer system").

An electronic receipt may be presented by a computing device of a customer in any suitable layout or format. For example, the receipt data 12 forming an electronic receipt may simply be presented as a textual list. Alternatively, an electronic receipt may follow the format of a paper receipt 10. That is, the electronic receipt may comprise a virtual representation or layout substantially matching all or a significant portion of what a comparable paper receipt 10 would look like.

The manner in which an electronic receipt is presented or displayed on a computing device of a customer may be completely dictated by the computer system delivering the receipt data 12 thereto. Alternatively, an application (e.g., a receipt manager, accounting program, budgeting program, or the like) installed on the computing device of a customer may partially or completely control the layout or format of an electronic receipt displayed therewith or therethrough. For example, a computer system may supply receipt data 12, while the application installed on the computing device of the customer supplies the layout or formatting.

A computer system in accordance with the present invention may deliver receipt data 12 or some portion thereof to a receipt printer 32b, a computing device of a customer, or a combination thereof in any suitable manner. In selected embodiments, a receipt module 60 may enable or support such delivery. A receipt module 60 may include any suitable arrangement of sub-components or modules. In certain embodiments, a receipt module 60 may include an image module 62, identification module 64, notification module 66, synchronization module 68, one or more other modules 70 as desired or necessary, or the like or some combination or sub-combination thereof.

An image module 62 may assemble, generate, or obtain an advertisement 14 comprising a call to action. A call to action may invite or motivate a customer to take a particular step or action. For example, a call to action may invite or motive a consumer to download receipt data 12. To increase the likelihood that a consumer will respond favorably to the call to action, an advertisement 14 may include an enabler facilitating the desired step or action. For example, in selected embodiments, an advertisement 14 may include a machine-readable code. By scanning the code (e.g., scanning the code using a camera on a computing device), a consumer may import receipt data 12 encoded within the code. Alternatively, scanning the code may initiate the download of receipt data 12.

For example, a machine-readable code may be encoded with a URL. In addition to designating a particular resource, a URL may also include a transaction identification (ID). Accordingly, after an appropriate application is launched and a machine-readable code is scanned, a URL may be passed from a customer (e.g., from a computing device of a customer) to an Internet Service Provider (e.g., a telecommunications provider). As a result, an appropriate resource within a computer system may be accessed and receipt data 12 may be returned to (e.g., downloaded by) a computing device.

In selected embodiments, a machine-readable code may comprise a barcode. For example, in certain embodiments, a machine-readable code may comprise a two-dimensional barcode. Two-dimensional barcodes may support or provide more data per unit area than can be obtained using a traditional one-dimensional barcode. Moreover, two-dimensional barcodes are typically configured to be scanned using a camera, an item that is commonly found on personal electronic devices. A two-dimensional barcode for use in accordance with the present invention may follow any suitable protocol, format, or system. In selected embodiments, a two-dimensional code may be embodied as a Quick Response (QR) Code.

An identification module 64 may be tasked with requesting, collecting, and/or communicating identification information linking a customer associated with a transaction with one or more records stored within a computer system. For example, as part of a transaction carried out at a POS system 22, an identification module 64 may request, collect, and/or communicate identification information linking a transaction to a particular computing device corresponding to the customer participating in the transaction. Thus, information corresponding to the transaction may be passed to the customer via the particular computing device.

An identification module 64 may request, collect, and/or communicate one or more types of identification information. For example, in selected embodiments, an identification module 64 may collect a unique identification or membership number from a customer. This may be done when a membership card, club card, loyalty card, identification card, credit card, debit card, fingerprint or other biometric characteristic, or the like is scanned, input, or otherwise collected at a POS system 22. In other situations, a cashier or customer may type in a unique identification number, payment number, membership number, or the like at a POS system 22. For example, while a cashier is processing a transaction, a customer may be prompted via a card reader 30*b*, customer-facing display 32*a*, or the like to enter (e.g., type in using the card reader 30*b*) a mobile telephone number corresponding to the customer. Alternatively, a cashier may type in a telephone number corresponding to the customer.

Once the identification information is received, it may be used directly (e.g., used directly to pass receipt data 12 to a computing device of a corresponding customer). Alternatively, or in addition thereto, the identification information may tie or link a current transaction to one or more previously stored computer records. For example, within such records, a computer system may find the information necessary to identify and communicate with a computing device of a corresponding customer.

A notification module 66 may assemble, generate, obtain, direct, and/or issue one or more push notifications. In selected embodiments, push notifications may be directed to a computing device of a customer. For example, when an appropriate application in not running on a computing device, push notifications may inform the customer that certain data or options are available (e.g., that a new electronic receipt is available for download).

A synchronization module 68 may support or enable one way or two way data communication between a computer system and a computing device. For example, a synchronization module 68 may support or enable the passing of receipt data 12 from a computer system to a computing device. A synchronization module 68 may also enable certain data received from a computing device to be incorporated within or used by a computer system. For example, one or more user preferences (e.g., notification preferences) may be communicated to a computer system from an application resident on a computing device.

The various functions or modules of a receipt module 60 may be enacted or implemented by any suitable system or component thereof. For example, in selected embodiments, one or more functions or modules of a receipt module 60 may be distributed across one or more hardware devices, including a primary computer 24 of a POS system 22, a local server 38, a supervisory server 48, some other onsite resource, a computing device, some other offsite resource, or the like or combinations or sub-combinations thereof. Thus, systems and methods in accordance with the present invention may be adapted to a wide variety of situations, including more rigid legacy systems.

Figure 5:
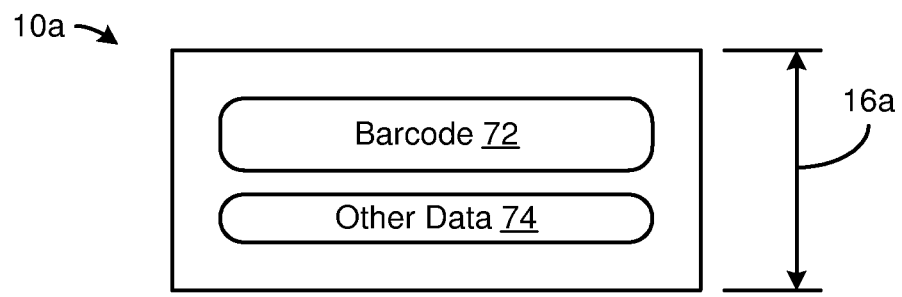
FIG. 5 is a schematic block diagram of one embodiment of an abbreviated paper receipt in accordance with the present invention.

Referring to FIG. 5, in selected embodiments or situations, a computer system may issue a paper receipt 10 even when an electronic receipt is sent to a customer. For example, a computer system may issue an abbreviated paper receipt 10*a*. An abbreviated paper receipt 10*a* may ensure that a customer has certain documentation should a computer or communication problem preclude a proper delivery of an electronic receipt.

In selected embodiments, an abbreviated paper receipt 10*a* may contain or present a limited set of receipt data 12. Accordingly, an abbreviated paper receipt 10*a* may be printed on a stub of paper having a very short length 16*a* (e.g., 0.75 to 1.75 inches). For example, an abbreviated paper receipt 10*a* may include a barcode 72 encoded with a transaction code or number and certain other data 12 (e.g., timestamp, number of items purchased, total amount 12*e* paid, or the like or a combination or sub-combination thereof). The length 16*a* of an abbreviated paper receipt 10*a* may be considered when determining an amount of paper saved through the use of electronic receipts.

Figure 6:
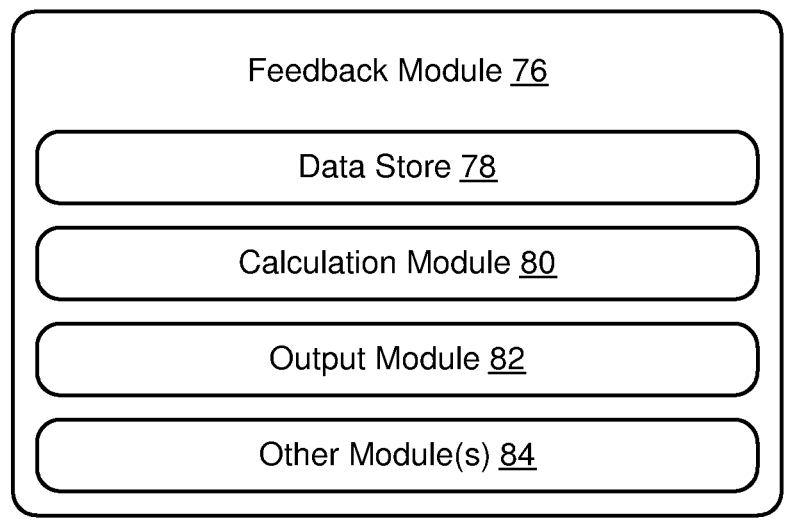
FIG. 6 is a schematic block diagram of one embodiment of a feedback module in accordance with the present invention.

Referring to FIG. 6, in selected embodiments, one or more computers, computers systems, mobile computing devices, or the like or a combination or sub-combination thereof may support or enable a feedback module 76. A feedback module 76 may enable certain data (e.g., an amount of paper saved) to be used in support of an electronic receipts program. A feedback module 76 may include any suitable arrangement of sub-components or modules. In certain embodiments, a feedback module 76 may include a data store 78, calculation module 80, output module 82, one or more other modules 84 as desired or necessary, or the like or a combination or sub-combination thereof.

In selected embodiments, a data store 78 may contain records supporting the operation of a feedback module 76.

For example, a data store 78 may contain records identifying the amount of receipt paper used or saved by one or more customers in one or more transactions. A data store 78 may also contain certain contextual information.

Contextual information may be data based on (e.g., numbers calculated using) the amount of receipt paper used or saved by one or more customers in one or more transactions. For example, a data store 78 may contain contextual information identifying a total amount of paper saved by one or more customer over a period of time (e.g., month, year, or the like), a highest or record amount of paper saved by one or more customer over a period of time (e.g., a personal best achieved during a month, year, or the like), a number reflecting paper savings of one or more other customers (e.g., savings for a particular store, group of stores, group of people, demographic, city, state, or the like), an average amount of paper saved by one or more customers over a period of time, a number reflecting potential paper savings of one or more other customers (e.g., savings goals or thresholds), or the like or a combination or sub-combination thereof.

In selected embodiments, contextual information may also include certain connections between one or more customers. For example, a data store 78 may contain records indicating that selected customers are "friends" or otherwise linked. Accordingly, in certain embodiments, a feedback module 76 may share savings corresponding to a first customer with one or more other customers that are recognized as friends of the first customer.

A calculation module 80 may be programmed to calculate one or more amounts or numbers and pass them to a data store 78 for safe keeping and future recall. In selected embodiments, a calculation module 80 may be responsible for determining how much paper is saved by one or more customers. A calculation module 80 may perform such calculations in any suitable manner.

For example, in selected embodiments, the line height, line spacing, and the like that would have been used in printing a paper receipt 10 may be known on a per printer basis. Accordingly, in such embodiments, an amount of paper saved may be calculated as a function of lines (e.g., text lines) on a receipt, the dimension(s) of certain fixed assets (e.g., top margin, logo 12a, advertisements 14, bottom margin, etc.), and the receipt printer 32b that would have been used. That is, while certain POS systems 22 in a retail chain may incorporate different receipt printers 32b, the characteristics (e.g., line height, line spacing, ability to do double sided printing, etc.) of those printers 32b may be known and factored in to provide the desired accuracy in calculating paper savings.

In certain embodiments, one or more electronic receipts may comprise a virtual representation or layout substantially matching all or a significant portion of what a comparable paper receipt 10 would look like. For example, an electronic receipt may include all the same data 12, formatting, and the like of a comparable paper receipt 10. In certain embodiments, the only significant difference may be an omission in the electronic receipt of an advertisement 14 that may be included in a paper receipt. When such an electronic receipt is created, it may correspond to, consume, or require a certain number of pixels. Accordingly, in selected alternative embodiments, a calculation module 80 may use a number corresponding to the required pixels (e.g., a number of pixel columns, pixel rows, total pixels, or the like) in determining how much paper has been or will be saved.

In certain embodiments, an amount of paper used, saved, or the like may be represented or quantified in terms of a measurement of distance (e.g., 10 inches of paper). Given the fixed width of receipt paper, the only significant variable may be length. Accordingly, an amount represented as a measurement of distance may be meaningful. Moreover, by identifying a number of pixels rows and a conversion factor correlating one or more pixel rows to a corresponding length of a paper receipt, a calculation module 80 may determine how much paper would have been consumed if a receipt had been issued as a paper receipt 10.

For example, a calculation module 80 may identify or determine that a particular electronic receipt consumes or requires 2850 pixels rows. The calculation module may further identify or determine that a proper conversion factor is one inch of receipt paper per 300 pixels. Accordingly, by multiplying the number of pixel rows by the conversion factor, the calculation module 80 may determine that to print a corresponding paper receipt 10 would have required 9.5 inches of paper. In certain embodiments, such a calculation may produce an accurate quantification of the amount of paper saved. Alternatively, one or more additional adjustments may be factored into the calculus.

For example, in selected embodiments, an abbreviated paper receipt 10a may be printed even when an electronic receipt is being issued. In such embodiments, the paper consumed by the abbreviated paper receipt 10a may be factored into the amount of paper saved. For example, a length 16a of paper consumed by an abbreviated paper receipt 10a may be subtracted from what may otherwise be the amount of paper saved. Continuing the example started above, an initial paper savings may appear to be 9.5 inches. However, an abbreviated paper receipt 10a may consume 1.25 inches of paper. Accordingly, a more accurate reflection of the amount of paper saved may be 8.25 inches.

Alternatively, or in addition thereto, in selected embodiments, a paper receipt 10 may include material that is not included within an electronic receipt, or vice versa. Accordingly, such differences may be factored into the amount of paper saved. For example, a paper receipt 10 may include an advertisement 14 that is not included within an electronic receipt. Further continuing the example started above, an initial paper savings may appear to be 8.25 inches. However, an advertisement 14 may add 1.5 inches to a paper receipt. Accordingly, a more accurate reflection of the amount of paper saved may be 9.75 inches.

In certain embodiments, an amount of paper used, saved, or the like may be represented or quantified in terms of a measurement of a characteristic other than distance. For example, paper saved may be represented in terms of area, volume, mass, weight, or the like. In selected embodiments, such representations may be accommodated using the methodology outlined hereinabove, modified with one or more additional factors incorporated therewithin. For example, to transition from a length to an area, an amount characterizing a length may be multiplied by an amount characterizing a width (e.g., a width of receipt paper). Additional multiplications may transition from area to volume, from volume to mass or weight, etc.

A calculation module 80 may calculate more than just the amount of paper saved. In selected embodiments, a calculation module 80 may calculate or assist in determining certain contextual information or numbers. For example, a calculation module 80 may calculate or otherwise assist in determining and/or updating all or a portion of the contextual information contained within a data store 78.

An output module 82 may support or enable the assembly and distribution of appropriate feedback. In assembling feedback, an output module 82 may rely on the records contained with a data store 78. In selected embodiments or situations, an output module 82 may generate feedback communicating to a customer an amount of paper saved in connection with a particular transaction (e.g., a transaction just completed), over a particular period of time, or the like or a combination thereof. For example, an output module 82 may generate and issue feedback stating "Congratulations, you saved 12.5 inches of paper in this transaction!" Alternatively, an output module 82 may generate and issue feedback like "Congratulations, you saved 12.5 inches of paper today, bringing your year-to-date savings to over 55 feet!"

In other embodiments or situations, an output module 82 may generate feedback communicating to a customer certain contextual information or contextual information in combination with an amount of paper saved. For example, an output module 82 may generate and issue feedback stating "Thanks for saving 12.5 inches of paper today bringing us that much closer to our nationwide goal of saving over 10.2 million feet this year!" Alternatively, an output module 82 may generate and issue feedback like "Congratulations, you've moved up to $45^{th}$ place in paper savings at this store!" In still other situations, an output module 82 may generate and issue feedback that is competitive (e.g., between friends linked within the records of a data store 78) like "Congratulations, you've now passed Kristin in paper savings this month!

As noted hereinabove, feedback may be textual in nature. Alternatively, feedback may be image-based. For example, feedback may include one or more plots, graphs, caricatures, animations, symbols, or the like. Accordingly, between the various permutations of format, content (e.g., data), and the like, an output module 82 may generate and issue or distribute a substantially unlimited number or variety of feedback.

An output module 82 may generate feedback in any suitable manner. In selected embodiments, an output module 82 may utilize one or more feedback templates (e.g., one or more templates contained within a data store 78. To generate personalized feedback, an output module 82 may select a template and insert appropriate personalized data therewithin. This personalized feedback may then be sent to a corresponding customer (e.g., to a computing device of the corresponding customer). To assist in determining which feedback templates are most effective and should, therefore, be used more often, an output module 82 may monitor various factors reflecting how different feedback messages, images, or the like are being received by customers.

An output module 82 may deliver feedback to a computing device in any suitable manner. In selected embodiments or situations, an output module 82 may pass feedback in real time to an appropriate application running on a computing device. In other embodiments or situations, an output module 82 may pass feedback in real time via a notification sent to a computing device. For example, an output module 82 may pass feedback using a push notification issue shortly (e.g., within one to ten seconds) after completion of a transaction. In selected embodiments or situations, an output module 82 may cooperate with a notification module 66 to generate or send such notifications.

The various functions or modules of a feedback module 76 may be enacted or implemented by any suitable system or component thereof. For example, in selected embodiments, one or more functions or modules of a feedback module 76 may be distributed across one or more hardware devices, including a primary computer 24 of a POS system 22, a local server 38, a supervisory server 48, some other onsite resource, a computing device, some other offsite resource, or the like or combinations or sub-combinations thereof. Thus, systems and methods in accordance with the present invention may be adapted to a wide variety of situations, including more rigid legacy systems.

Figure 7:
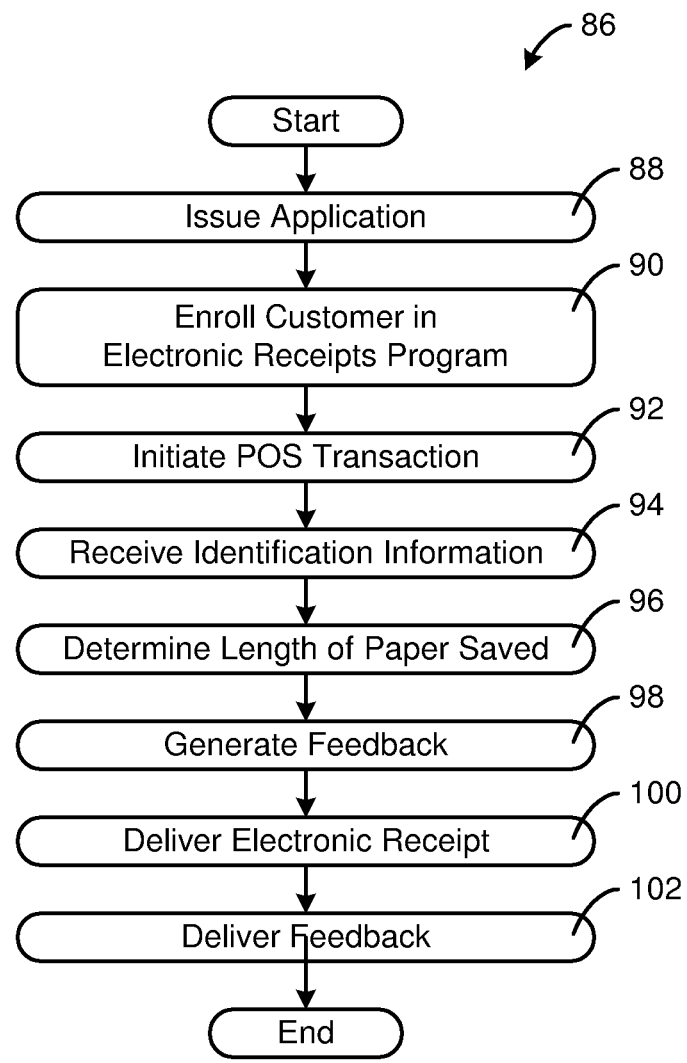
FIG. 7 is a block diagram of one embodiment of a method for calculating and reporting paper savings in accordance with the present invention.

Referring to FIG. 7, one method 86 in accordance with the present invention may begin when an appropriate application (e.g., a retailer's mobile application, an electronic receipts application, or the like or a combination or sub-combination thereof) is issued 88 and installed on a computing device of a customer. A computer system may then enroll 90 the customer in an electronic receipts program. In selected embodiments, this enrollment 90 may result in the computing device being linked to or associated with certain identification information within the records of a computer system.

So prepared, a customer may then enter a "brick-and-mortar" business location (e.g., enter a brick-and-mortar retail store with his or her computing device), select one or more items for purchase, and approach a POS system 22. At the POS system 22, a transaction (e.g., a purchase of one or more items) may be initiated 92.

During the transaction, a computer system may receive 94 identification information. For example, a POS system 22 may scan a membership card, club card, loyalty card, identification card, credit card, debit card, or the like. From the scan, identification information (e.g., a unique identification number, membership number, or the like) may be obtained. Alternatively, while a cashier is processing a transaction, a customer may be prompted via a card reader 32b, customer-facing display 32a, or the like to enter (e.g., type in using the card reader 32b) an identification number (e.g., a mobile telephone number).

Identification information may be passed from a POS system 22 to one or more other computers (e.g., servers 38, 48) within a computer system. The identification information may link a customer and a corresponding transaction to one or more records stored within a computer system. In selected embodiments, such records may contain the information necessary to identify and communicate with a computing device of the corresponding customer. Such records may also contain information relative to past paper savings and the like stored within a data store 78.

During a transaction or shortly thereafter, a calculation module 80 may determine 96 an amount (e.g., length) of paper that has been or will be saved. Accordingly, feedback based on the amount saved may be generated 98. As some point, an electronic receipt and the feedback may be delivered 100, 102. Typically, the electronic receipt, feedback, or some combination thereof may be sent to an appropriate computing device substantially immediately upon completion (e.g., within one second or less of completion 86) of a corresponding transaction. Accordingly, the electronic receipt, feedback, or one or more corresponding push notifications may typically be received by a computing device very shortly (e.g., within four seconds and preferably within about two seconds) after completion of the transaction. Accordingly, if a customer is carrying the corresponding computing device on his or her person within the brick-and-mortar location, the customer may be alerted (e.g., by sound, vibration, or the like) that the receipt and/or feedback is available within the time it would typically require to print a paper receipt 10.

The flowchart in FIG. 7 illustrates the architecture, functionality, and operation of possible implementations of systems, methods, and computer program products according to certain embodiments of the present invention. In this regard, each block in the flowchart may represent a module, segment, or portion of code, which comprises one or more executable instructions for implementing the specified logical function(s). It will also be noted that each block of the flowchart illustration, and combinations of blocks in the flowchart illustration, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A computer-implemented method for motivating customer participation in an electronic receipt program, the method comprising:
    initiating a point-of-sale transaction involving a computer system comprising a point-of-sale system and a customer possessing a mobile computing device;
    generating, by the computer system, receipt data documenting the point-of-sale transaction;
    delivering, by the computer system, the receipt data to the mobile computing device in electronic format;
    determining, by the computer system, an amount of paper saved by delivering the receipt data in electronic format rather than as a paper receipt; and
    passing, by the computer system, the amount to the mobile computing device.

2. The method of claim 1, further comprising receiving the customer within a brick-and-mortar location containing the point-of-sale system.

3. The method of claim 2, wherein the initiating comprises initiating the point-of-sale transaction at the point-of-sale system.

4. The method of claim 3, wherein the amount is a measurement of distance.

5. The method of claim 4, wherein the determining comprises determining a number of pixel rows used to display the receipt data in electronic format.

6. The method of claim 5, wherein the determining further comprises multiplying the number by a conversion factor, the conversion factor correlating one or more pixel rows and a corresponding length of paper receipt.

7. The method of claim 6, further comprising outputting, by the point-of-sale system, a paper stub providing abbreviated documentation of the point-of-sale transaction.

8. The method of claim 7, wherein the determining further comprises subtracting a length of the paper stub.

9. The method of claim 8, wherein the determining further comprises adding a length corresponding to an advertisement inviting a customer to particulate in the electronic receipt program.

10. The method of claim 4, further comprising obtaining, by the computer system, a contextual number providing context for the amount.

11. The method of claim 10, wherein the passing comprises passing, by the computer system, the amount and the contextual number to the mobile computing device.

12. The method of claim 11, wherein the contextual number is selected from the group consisting of a total amount of paper saved by the customer of a period of time, a number reflecting paper savings of one or more other customers, and a number reflecting potential paper savings of one or more other customers.

13. A method for motivating participation in an electronic receipt program, the method comprising:
    initiating a point-of-sale transaction involving a computer system comprising a point-of-sale system and a customer possessing a mobile computing device;
    generating, by the computer system, receipt data documenting the point-of-sale transaction;
    delivering, by the computer system, the receipt data to the mobile computing device in electronic format;
    determining, by the computer system, an amount of paper saved by delivering the receipt data in electronic format rather than as a paper receipt;
    transforming, by the computer system, the amount into feedback; and
    passing, by the computer system, the feedback to the mobile computing device.

14. The method of claim 13, further comprising receiving a character string entered by the customer into the point-of-sale during the transaction, the character string uniquely identifying the mobile computing device within the computer system.

15. The method of claim 14, wherein the feedback encourages the customer to elect to receive an electronic receipt in a future point-of-sale transaction and save additional paper.

16. The method of claim 15, wherein the feedback comprises a comparison based at least partially on the amount.

17. The method of claim 15, wherein the amount is a measurement of distance.

18. The method of claim 17, wherein the determining comprises determining a number of pixel rows used to display the receipt data in electronic format.

19. The method of claim 18, wherein the determining further comprises multiplying the number by a conversion factor, the conversion factor correlating one or more pixel rows and a corresponding length of paper receipt.

20. A computer system comprising:
    one or more processors;
    one or more memory devices operably connected to the one or more processors; and
    the one or more memory devices collectively storing
        a receipt module programmed to deliver receipt data documenting one or more point-of-sale transactions to one or more computing devices of corresponding customers,
        a data store containing records,
        a calculation module programmed to determine an amount of paper saved when a customer receives an electronic receipt rather than a paper receipt,
        the calculation module further programmed to store the amount within one or more records of the data store, and
        a feedback module programmed to communicate the amount to the customer via a computing device corresponding thereto.

* * * * *